(12) United States Patent
Huang et al.

(10) Patent No.: US 6,715,890 B2
(45) Date of Patent: Apr. 6, 2004

(54) ADJUSTABLE HEIGHT APPARATUS OF A HORIZONTAL PROJECTOR

(75) Inventors: Kuo-Chin Huang, Hsinchu (TW); Kuan-Chou Ko, Hsinchu (TW)

(73) Assignee: Coretronic Corporation, Hsinchu (TW)

( * ) Notice: Subject to any disclaimer, the term of this patent is extended or adjusted under 35 U.S.C. 154(b) by 238 days.

(21) Appl. No.: 10/067,194

(22) Filed: Feb. 7, 2002

(65) Prior Publication Data

US 2002/0113951 A1 Aug. 22, 2002

(30) Foreign Application Priority Data

Jan. 19, 2001 (TW) ....................... 90202439 U
Jun. 15, 2001 (TW) ................... 90202439A01 U (51) Int. Cl.[7] ..................... G03B 21/14; F16M 11/24
(52) U.S. Cl. ................. 353/119; 353/70; 248/188.2
(58) Field of Search ................. 353/70, 119; 248/371, 248/393, 188.1, 188.2, 188.8, 404

(56) References Cited

U.S. PATENT DOCUMENTS

| | | | | |
|---|---|---|---|---|
| 4,141,523 A | * | 2/1979 | Brendgens | 248/653 |
| 5,720,539 A | * | 2/1998 | Woo | 353/69 |
| 5,788,355 A | * | 8/1998 | Na | 353/101 |
| 6,302,543 B1 | * | 10/2001 | Arai et al. | 353/70 |
| 6,461,002 B1 | * | 10/2002 | Su | 353/119 |
| 6,604,831 B1 | * | 8/2003 | Prestigomo et al. | 353/119 |
| 2002/0140909 A1 | * | 10/2002 | Tanaka | 353/70 |
| 2002/0153465 A1 | * | 10/2002 | Su | 248/404 |

* cited by examiner

Primary Examiner—William C. Dowling
(74) Attorney, Agent, or Firm—Nath & Associates PLLC; Harold L. Novick (57) ABSTRACT

The present invention relates to an adjustable height apparatus applied to a horizontal projector and comprises a shield assembly, a supporting means, a compression link and a lever. When adjusting the projection elevation, an external force is applied on an adjusting button of the top wall of the projector. The compression link, connecting with the button, makes a vertical movement according to the external force and pushes the detent of the lever to depart from contact with the axial height-positioning component. The sleeve extends toward the outside of said shell by the elasticity of a first elastic component for adjusting a suitable height of the bottom base of the supporting means of the projector.

24 Claims, 5 Drawing Sheets

ADJUSTABLE HEIGHT APPARATUS OF A HORIZONTAL PROJECTOR

FIELD OF THE INVENTION

This invention relates to an adjustable height apparatus, and specifically relates to an adjustable height apparatus of a horizontal projector.

BACKGROUND OF THE INVENTION

Since optical projecting systems have been developed they have served many purposes and have been applied to many fields, such as the use of projecting systems during conferences for projecting enlarged images, or to project and display instant images on a projecting screen.

Generally speaking, most types of the above-mentioned projecting equipment are utilized in a horizontal position. Traditionally, each of them usually has two height adjustable height groups located on its left and right sides. When adjusting the heights of these two adjustable height groups, they should be adjusted simultaneously and the heights of the two sides should be maintained in order to avoid the machine from becoming unstable and the image it projects slanted. Moreover, these two height adjustable groups comprise buttons, mostly equipped separately on the left and right sides, or on the front of the left and right sides. It is difficult to adjust the adjustable height apparatus and also takes much time of height adjustment, while maintaining its horizontal status, only by using hands.

It should be noted that electrical consumer products have been developed with a trend to be lightweight, thinner, shorter and smaller. It is not easy to assemble two groups of adjustment height mechanisms into such a limited volume. Accordingly, there is a need to improve the adjustable height apparatus to fit this trend and increase the ease of operation.

SUMMARY OF THE INVENTION

An object of this invention is to provide an adjustable height apparatus in a horizontal projector.

Another object of this invention is to provide an adjustable height apparatus with a single supporting device applied in a horizontal projector.

Still another object of this invention is to provide an adjustable height apparatus, applied in a horizontal projector, with merits of easy operation and increased supporting strength.

The invention discloses an adjustable height apparatus applied to a horizontal projector. The adjustable height apparatus comprises a shield assembly, a supporting means, a compression link and a lever. The shield assembly comprises a shell, a first fixed base and a second fixed base, while both first and second bases are located on the left and the right sides inside the shell separately. The supporting means comprises a bottom base, a first elastic component and a sleeve. The bottom base is located outside of the shell and connects with the sleeve. The sleeve comprises an empty chamber inside, and the first end of the sleeve is open and connects with the chamber. The first elastic component is located within the chamber, and the elasticity of the first elastic component is sufficient to have close contact between the first end of the sleeve and the top wall of the shell. The second end of the sleeve connects with the bottom base. A height-positioning component, comprising a plurality of teeth, is located in a longitudinal direction of said sleeve's outer surface. In addition, the compression link is assembled within the second fixed base in order to constrain the compression link's movement direction. The first end of the compression link receives an external force, applied on the outside of the shell. The lever is pivoted inside the shell and is located between the compression link and the height-positioning component of the supporting means. The first end of the lever connects with the second elastic component, while the second elastic component connects with the shell's sidewall. The elasticity of the second elastic component is sufficient to have close contact between the first end of the lever and the second end of the compression link. The second end of the lever is formed as a detent for engagement with the teeth of the height positioning component by means of the elasticity of the second elastic component. To adjust the projection height, an external force is applied and the detent at the second end of the lever thus departs from contact with the height-positioning component. The sleeve extends toward the outside of said shell by the elasticity of the first elastic component for adjusting the height of the bottom base of the supporting means.

The invention further discloses another adjustable height apparatus applied to a horizontal projector with a better supporting strength. The adjustable height apparatus comprises a shield assembly, a supporting means, a compression link and a fixture means. The supporting means comprises a bottom base, a first elastic component and a height-positioning component with a toothed structure, such as a rack, utilized to support the projector. The fixture means comprises a second elastic component, a detent and an inclined plane. Particularly, the detent comprises a two-teeth structure matched with the teeth of the height-positioning component by the elasticity of said second elastic component. The second end of the compression link contacts the inclined plane of the fixture means to disengage the two-teeth structure of the detent from the height-positioning component when the first end of the compression link is pressed by an external force. Accordingly, the supporting means extends toward the outside of the shield assembly by the elasticity of the first elastic component for adjusting the height of the bottom base of the supporting means.

DETAILED DESCRIPTION OF THE PREFERRED EMBODIMENT

Figure 1:
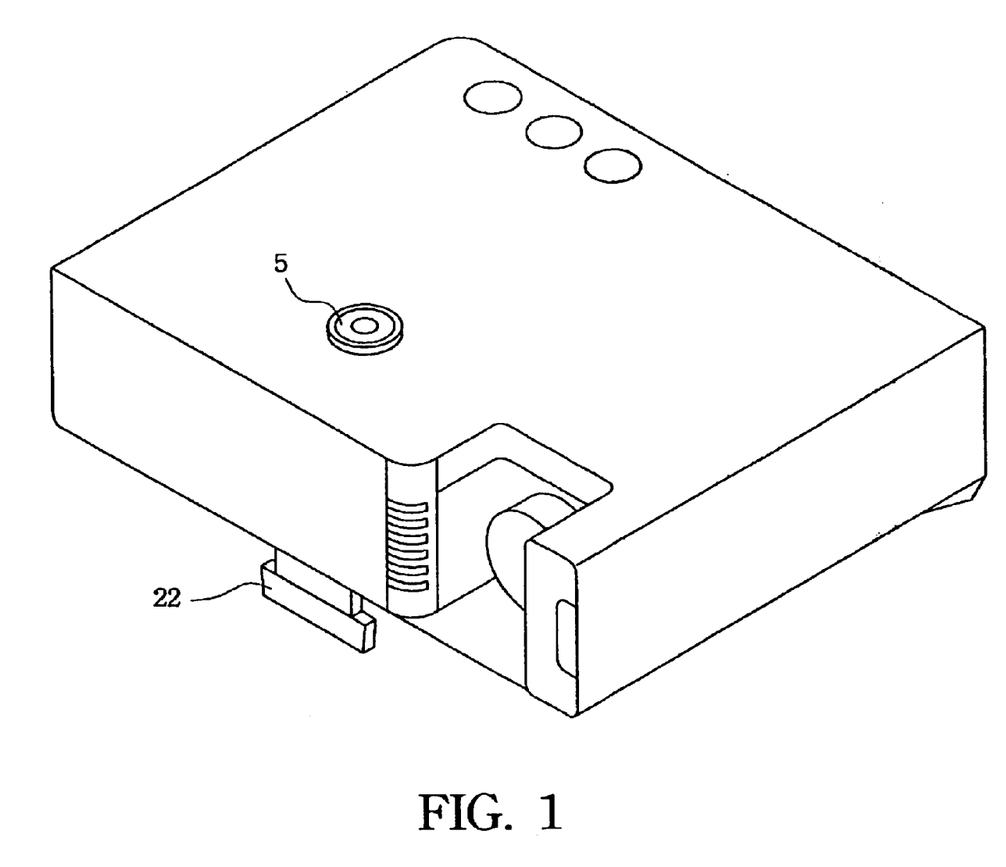
FIG. 1 schematically illustrates an adjustable height apparatus, applied to a horizontal projector, of this present invention.

The present invention provides an adjustable height apparatus applied to a horizontal projector. This adjustable height apparatus can be assembled into a limited space inside the projector, with a single supporting means in order to be operated easily to adjust a suitable height for the projector. As shown in FIG. 1, an adjustable height apparatus, applied to a horizontal projector, of this present invention, is schematically illustrated. Specifically, a button 5 for height adjustment is located on the top wall of the projector. While adjusting the projection height of the projector, only an external force, applied by a user, will be needed to apply on the button 5, and a bottom base 22 will accordingly extend outward and downward to a desired length, depending on a projection angle. When the applied force removed away from the button 5, a suitable projection height for projecting images can be accomplished. Therefore, the difficulty of adjusting the traditional adjustable height apparatus of both sides of the projector simultaneously, and the difficulty of finding out a good horizontal projection surface, can be solved by this present invention.

Figure 2:
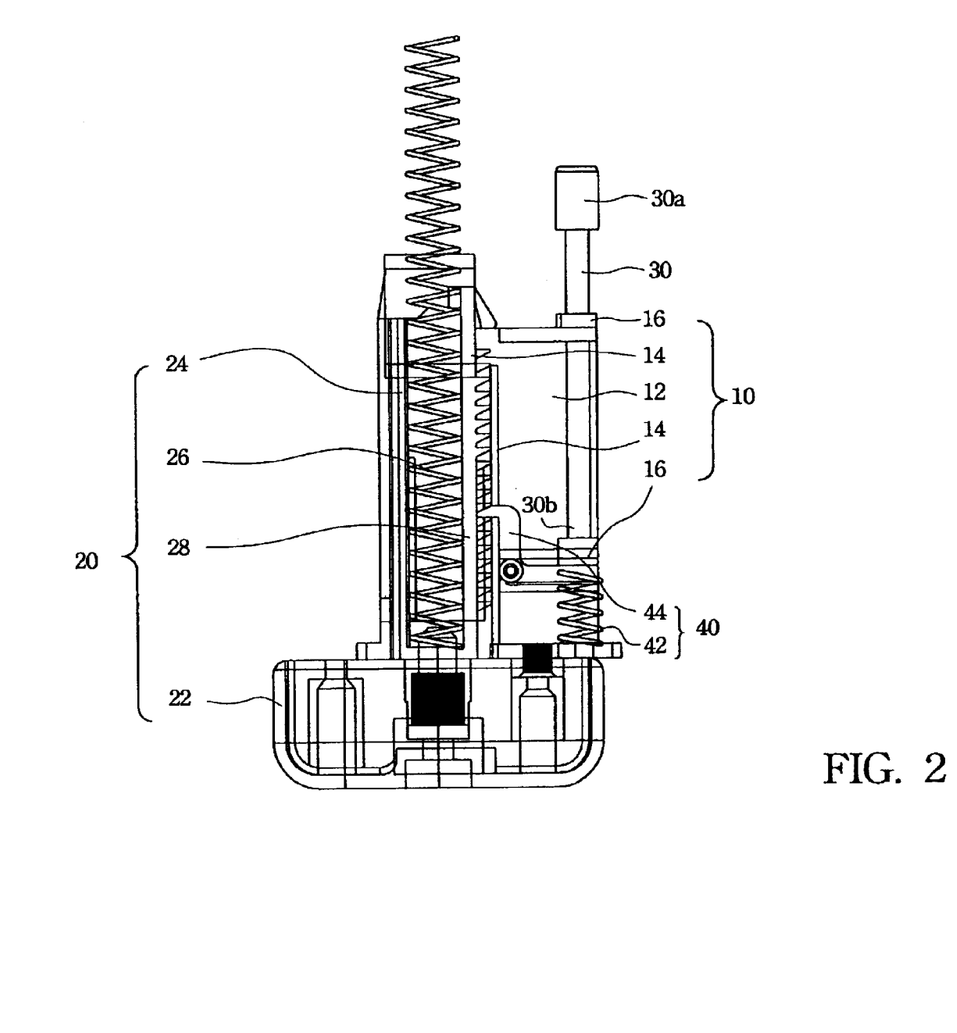
FIG. 2 schematically illustrates the cross section of an adjustable height apparatus, of this present invention.

Referring to FIG. 2, each component of the adjustable height apparatus, of the present invention, is schematically illustrated. The height adjustable apparatus comprises a shield assembly 10, a supporting means 20, a compression link 30 and a lever 40. The shield assembly 10 is assembled inside the projector to contain most components of the adjustable height apparatus. Only one part of both the supporting means 20 and the compression link 30 extend toward the outside of the shield assembly 10 for respectively supporting the weight of the projector and for receiving an external force while adjusting the elevation of the adjustable height apparatus. More specifically, the shield assembly further comprises a shell 12, a first fixed base 14, and a second fixed base 16, while the first base 14 is utilized for containing the supporting means 20, the second base 16 is utilized for containing the compression link 30 and both bases 14 and 16 are located in the left and the right sides inside the shell 12 separately.

Still referring to FIG. 2, the supporting means 20 is utilized to support the weight of the projector and comprises a bottom base 22, a first elastic component 26 and a sleeve 24, which further comprises a chamber and a height-positioning component 28. The bottom base 22 is located outside of the shell 12 and the projector, connecting with the sleeve 24. The sleeve 24 is a movable cylinder with the empty chamber inside, and moreover, the first end of the sleeve 24 is open and communicates with that chamber, while the first elastic component 26 is located within that chamber, and the elasticity of the first elastic component is sufficient to have close contact between the first end of the sleeve 24 and the top wall of the shell 12. In a preferred embodiment, the first elastic component 26 is a spring and the other substitute with the same elasticity function is regarded within the spirit and true scope of the present invention. The second end of the sleeve 24 connects with the bottom base 22 and extends toward the outside of the shell 12 by means of the elasticity of the first elastic component 26 to provide the projector a suitable projection angle or height. Moreover, the height-positioning component 28 is located, in the axial direction, on the outer sidewall of the sleeve 24, comprising a plurality of teeth, with the same distance between every two adjacent teeth to facilitate the control of the sleeve extension, for the required elevation.

As mentioned above, the compression link 30 is assembled within the second fixed base 16 for limiting the movement direction of the compression link 30. More specifically, the first end 30a of the compression link 30 is used to receive an external force, located on the outside of the shell. First end 30a also connects with the button 5 on the top wall of the projector, as shown in FIG. 1, to transfer the external force to the second end 30b of the compression link 30 for having close contact with the lever 40 therebetween. While the lever, with an L-type, is pivoted inside the shell 12 and located between the compression link 30 and the height-positioning component 28 of the supporting means 20. However, the first end of the lever 40 connects with the second elastic component 42, while the second elastic component 42 connects with the sidewall of the shell 12. It is noted that the elasticity of the second elastic component 42 is sufficient to have close contact between the first end of the lever 40 and the second end 30b of the compression link 30. In a preferred embodiment, the second elastic component 42 is a spring and the other substitute to have close contact between the lever 40 and the compression link 30 will be regarded within the spirit and true scope of the present invention.

The second end of the lever 40 comprises a detent 44 for engagement with the teeth of the height-positioning component 28 by means of the elasticity of the second elastic component 42. When adjusting the projection height, an external force, delivered from the second end 30b of the compression link 30, is applied to resist the elasticity of the second elastic component 42. The detent 44 at the second end of the lever 40 thus departs from contact with said height-positioning component 28. Meanwhile, the sleeve 24 of the supporting means 20 will extend toward the outside of the shell 12 by means of the elasticity of the first elastic component 26. After a suitable projection angle or height is obtained, simply remove the pressing force of the user's finger from the button 5 and this completes the elevation adjustment of the supporting means 20.

Figure 3:
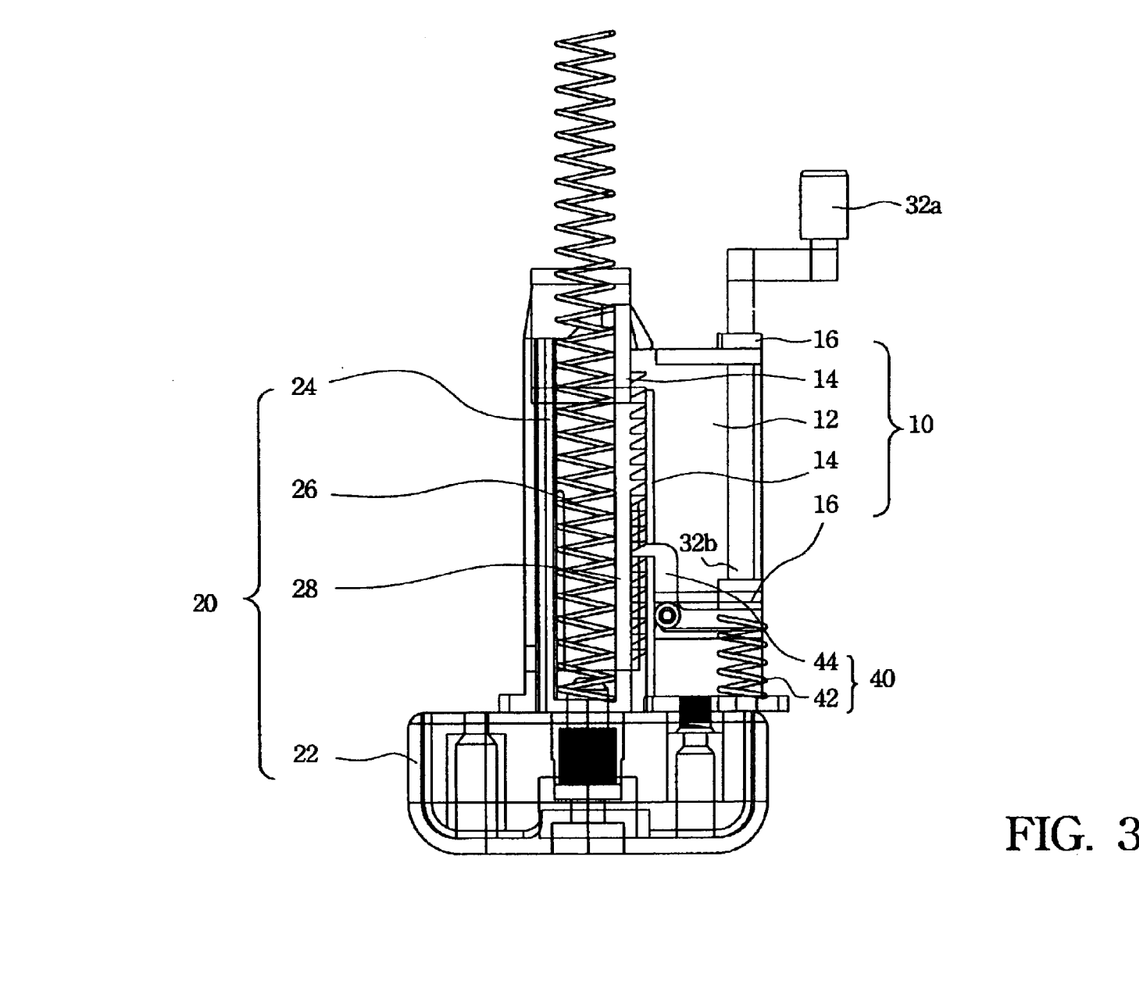
FIG. 3 schematically illustrates the cross section of the adjustable height apparatus of FIG. 2 with an L-type end, of this present invention.

Referring to FIG. 3, another embodiment of the adjustable height apparatus, of this present invention, is schematically illustrated. The only one difference compared with the above-mentioned is that the compression link 32 is an L-type link. That is the structure of the compression link 32 comprises an L-type link in the first end 32a. This design is utilized to fulfill the requirement of different locations of the button 5 on the top wall of the projector and facilitate the function of delivering an external force, pressed on the button 5.

Figure 4:
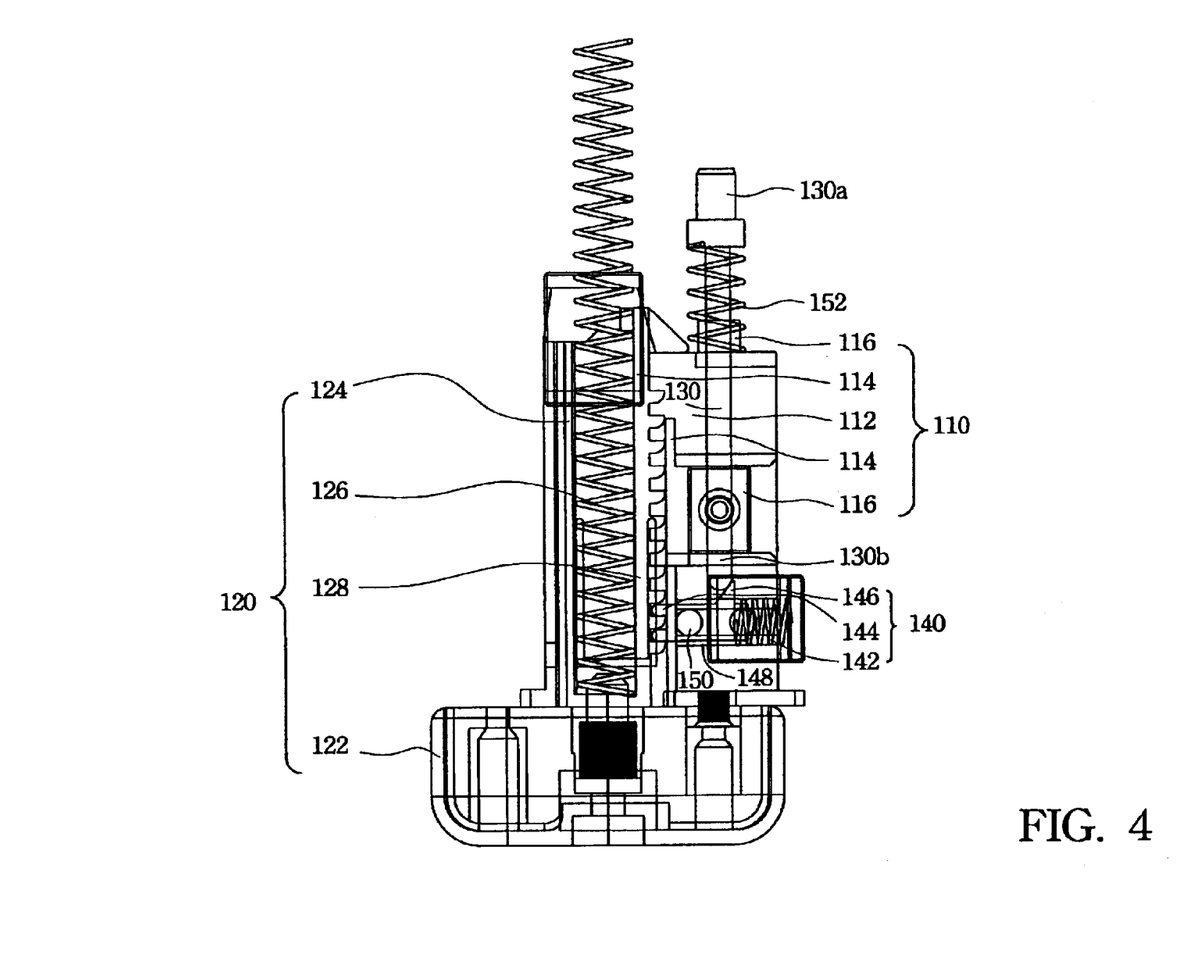
FIG. 4 schematically illustrates the cross section of another adjustable height apparatus, of this present invention.

Referring to FIG. 4, another embodiment of the adjustable height apparatus of the present invention is schematically illustrated. The height adjustable apparatus comprises a shield assembly 110, a supporting means 120, a compression link 130 and a fixture means 140. The shield assembly 110 is assembled inside the projector to contain most components of the adjustable height apparatus. Only one part of both the supporting means 120 and the compression link 130 extend toward the outside of the shield assembly 110 for respectively supporting the weight of the projector and for receiving an external force while adjusting the elevation of the adjustable height apparatus. More specifically, the shield assembly further comprises a shell 112, a first fixed base 114, and a second fixed base 116, while the first base 114 is utilized for containing the supporting means 120, the second base 116 is utilized for containing the compression link 130. Both bases 114 and 116 are located in the left and the right sides inside the shell 112 separately.

Still referring to FIG. 4, the supporting means 120 is utilized to support most of the projector's weight. It comprises a bottom base 122, a first elastic component 126 and a sleeve 124, which further comprises a chamber and a height-positioning component 128. The bottom base 122 is located outside of the projector and connects with the sleeve 124. The sleeve 124 is a movable cylinder with an empty chamber inside. Moreover, the first end of the sleeve 124 is open and communicates with that chamber. The first elastic component 126 is located within that chamber, and the elasticity of the first elastic component is sufficient to have close contact between the first end of the sleeve 124 and the top wall of the shell 112. In a preferred embodiment, the first elastic component 126 is a spring. The other substitute with the same elasticity function is regarded within the spirit and true scope of the present invention. The second end of the sleeve 124 connects with the bottom base 122 and extends toward the outside of the shell 112 by means of the elasticity of the first elastic component 126 to provide the projector a suitable projection angle or height. Moreover, the height-positioning component 128 is located, in an axial direction, on the outer surface of the sleeve 124, comprising a plurality of teeth, with the same distance between every two adjacent teeth to facilitate the control of the sleeve extension, for the required elevation.

As mentioned above, the compression link 130 is assembled within the second fixed base 116 for constraining the moving direction of the compression link 130. More specifically, the first end 130a of the compression link 130 is used to receive an external force, located on the outside of the shell 112. The first end 130a also connects with the button 5 on the top wall of the projector, as shown in FIG. 1, to transfer the external force to the second end 130b of the compression link 130 for having close contact with the fixture means 140 therebetween. The fixture means 140 comprises a second elastic component 142, a detent 144 and an inclined plane 146. The detent 144 connects with the second elastic component 142, while the second elastic component 142 connects with the shell 112. The detent 144 matches with the teeth of the height-positioning component 128 by the elasticity of the second elastic component 142. In a preferred embodiment, the second elastic component 142 is a spring. The other substitute having close contact between the fixture means 140 and the compression link 130 will be regarded within the spirit and true scope of the present invention.

Particularly, when an external force is delivered from the button 5 via the second end 130b of the compression link 130 an inclined plane 146, while adjusting the height of the projector, the second end 130b of the compression link 130 will contact the inclined plane 146 and shift the fixture means transversely against the elasticity the second elastic component 142. As a result, the detent 144 will be disengaged from the teeth of the height-positioning component 128. Meanwhile, the sleeve 124 of the supporting means 120 will extend outward by means of the elasticity of the first elastic component 126 till a suitable height of the bottom base 122 of the supporting means 120 is obtained.

One feature of this embodiment of the present invention is mainly focus on the design of the inclined plane 146 of the fixture means 140. It can decompose the external force applied on the compression link 130 into the horizontal thrust for pushing the fixture means 140 transversely in order to control the height adjustment of the projector. More specifically, one merit of pushing the fixture means 140 transversely is to obtain a more sufficient supporting strength. As illustrated in FIG. 2, the movement of the lever 40 is rotation one so that the supporting strength, the lever 40 offered, will depend on the torque, which is determined both by the elasticity of the second elastic component 42 and the arm of the lever 40. There is still a possibility of pushing the detent 44 of the lever 40 away from contact with the height-positioning component 28, if the reacting force exerted on the supporting means is larger than that torque, the lever 40 offered. Therefore, if a sufficient supporting strength is required, a proper elasticity of the second elastic component 42 is demanded. Nevertheless, because the movement of the fixture means 140 is horizontal one, therefore, the possibility of pushing the detent 144 of the fixture means 140 away from contact with the height-positioning component 128 is much decreasing unless the detent 144 of the fixture means 140 is destroyed under an improper reacting force exerted on the supporting means 120. In a preferred embodiment, the supporting strength, the lever 40 offered, is about 5~10 kgw, while the supporting strength, the fixture means 140 offered, is about 20~30 kgw.

It should be noted the adjustable height apparatus of the present invention mostly is installed inside the projector. The environmental temperature surrounding the adjustable height apparatus will be high due to the lamp of the projector. Accordingly, the materials of the detent 144 and the inclined plane 146 comprise nylon and 15% glass fiber as wear and heat resisting materials. Moreover, the joint of the shield assembly 110 with the fixture means 140 further comprises two guides 148 to facilitate to track the fixture means 140 shifting transversely. The fixture means 140 also comprises two round bulges for fitting with the guides 148.

Further, the second end of the compression link 130b comprises a curved surface for contacting the inclined plane 146 of the fixture means 140. A third elastic component 152 is installed between the first end of the compression link 130 and the shield assembly 110 to cooperate with the second elastic component 142. In a preferred embodiment, the third elastic component 152 is a spring.

Figure 5:
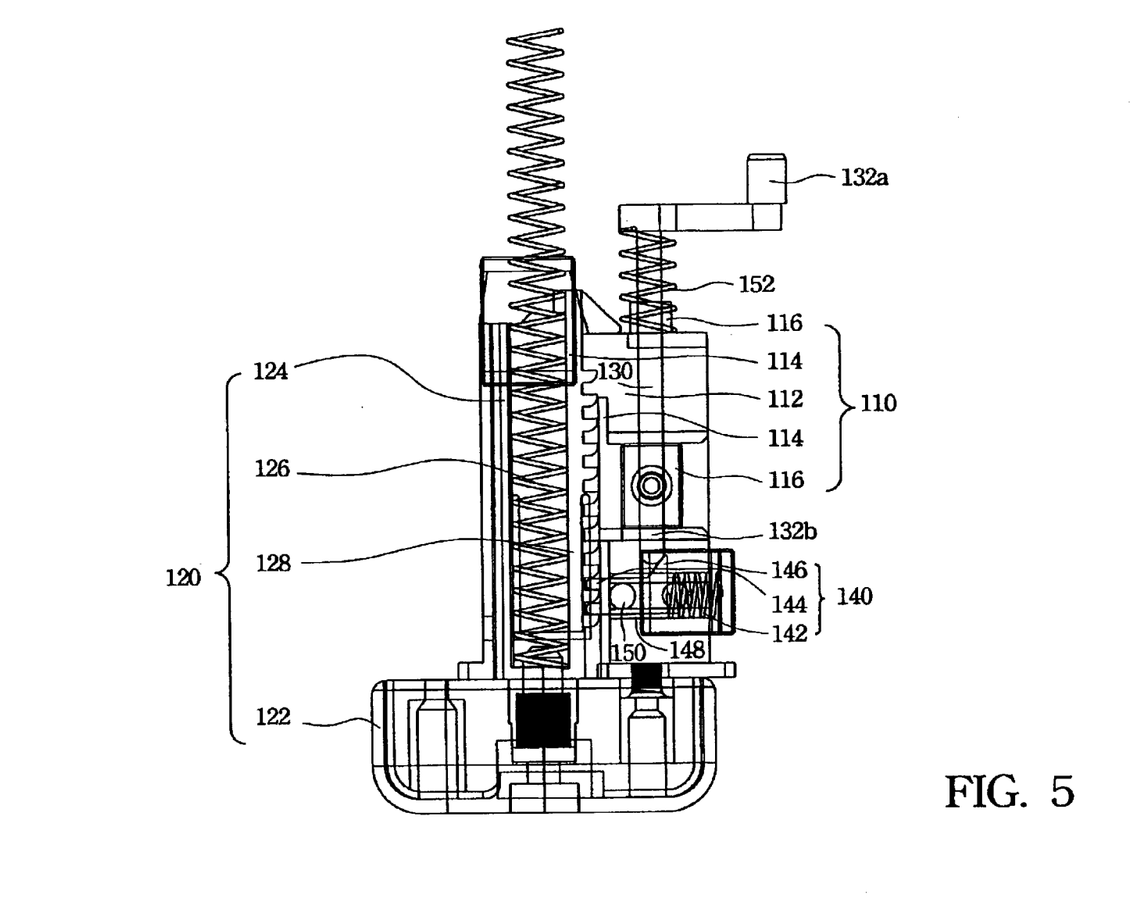
FIG. 5 schematically illustrates the cross section of the adjustable height apparatus of FIG. 4 with an L-type end, of this present invention.

Referring to FIG. 5, another embodiment of the adjustable height apparatus, of this present invention, is schematically illustrated. The only one difference compared with the one shown in FIG. 4 is that the compression link 132 is an L-type link. That is the structure of the compression link 132 comprises an L-type link in the first end 32a. This design is utilized to fulfill the requirement of different locations of the button 5 on the top wall of the projector and facilitate the function of delivering an external force, pressed on the button 5.

Although the invention has been described in detail herein with reference to its preferred embodiment, it is to be understood that this description is by way of example only, and is not to be interpreted in a limiting sense. It is to be further understood that numerous changes in the details of the embodiments of the invention, and additional embodiments of the invention, will be apparent, and may be made by, persons of ordinary skill in the art having reference to this description. It is considered that such changes and additional embodiments are within the spirit and true scope of the invention as claimed below.

We claim:

1. An adjustable height apparatus, for supporting a horizontal projector, said apparatus comprising:

a shield assembly, assembled inside said projector;

a supporting means, for supporting said projector, assembled within said shield assembly;

a compression link, assembled within said shield assembly, the first end of said compression link extending toward the outside of said shield assembly, for receiving an external force exerted on a button of said adjustable height apparatus; and a fixture means, assembled within said shield assembly, for connecting said the second end of said compression link to adjust the height position of said supporting means.

2. The apparatus as recited in claim 1, wherein said supporting means further comprises:

a bottom base;

a first elastic component; and a sleeve, said sleeve comprising a height-positioning component, wherein said bottom base located outside said shield assembly and connecting with said sleeve for directly supporting said projector, said first elastic component located within said sleeve and having sufficiently close contact with both the first end of said sleeve and the top wall of said shield assembly, and said height-positioning component, in a longitudinal direction of said sleeve, comprising a plurality of teeth for positioning the height position of said adjustable height apparatus.

3. The apparatus as recited in claim 2, wherein said fixture means is a lever, pivoted inside said shield assembly between said compression link and said supporting means, further comprising:

a second elastic component; and a detent, wherein the first end of said lever connecting with said second elastic component and the elasticity of said second elastic component having sufficiently close contact with both the first end of said lever and the second end of said compression link, said detent at the second end of said lever utilizing to match with said teeth of said height-positioning component and being disengaged with said teeth of said height-positioning component when an external force applied to said compression link, whereby said sleeve extending toward the outside of said shield assembly by the elasticity of said first elastic component for adjusting the height of said bottom base of said supporting means.

4. The apparatus as recited in claim 3, wherein said first and said second elastic components are springs.

5. The apparatus as recited in claim 2, wherein said fixture means further comprises:

a second elastic component;

a detent; and an inclined plane, wherein said detent can be matched with said teeth of said height-positioning component by the elasticity of said second elastic component, the second end of said compression link having contact with said inclined plane to disengage said detent from said teeth of said height-positioning component when the first end of said compression link receives an external force to perform a vertical displacement, whereby said sleeve extending toward the outside of said shield assembly by the elasticity of said first elastic component for adjusting the height of said bottom base of said supporting means.

6. The apparatus as recited in claim 5, wherein said detent further comprises a two-teeth structure for matching with said teeth of said height-positioning component.

7. The apparatus as recited in claim 5, wherein materials of said detent and said inclined plane of said fixture means comprises nylon and 15% glass fiber.

8. The apparatus as recited in claim 5, wherein the second end of said compression link further comprises a curved surface for contacting said inclined plane.

9. The apparatus as recited in claim 5, wherein said shield assembly further comprises two guides for tracking said fixture means to shift transversely.

10. The apparatus as recited in claim 9, wherein said fixture means further comprises two round bulges for fitting with said guides to shift transversely.

11. The apparatus as recited in claim 5, further comprises a third elastic component located between the first end of said compression link and said shield assembly to cooperate with said second elastic component.

12. The apparatus as recited in claim 11, wherein said first, said second and said third elastic components are springs.

13. The apparatus as recited in claim 1, wherein the first end of said compression link further comprises an L-type lever connecting with said button.

14. An adjustable height apparatus, applied to a horizontal projector, of said apparatus comprising:

a shield assembly, assembled inside said projector, said shield assembly comprising:

a shell;

a first fixed base; and a second fixed base, said first base and said second base located in the left and the right sides of said shell separately;

a supporting means, for supporting said projector, assembled within said first fixed base, said supporting component comprising:

a bottom base;

a first elastic component; and a sleeve, said sleeve comprising:

a chamber;

a height-positioning component, said bottom base located outside said shell and connecting with said sleeve, the first end of said sleeve being open and communicating with said chamber, said first elastic component located within said chamber and the elasticity of said first elastic component being sufficient to have close contact between the first end of said sleeve and the top wall of said shell, the second end of said sleeve connecting with said bottom base, and said height-positioning component, with an axial direction of said sleeve, comprising a plurality of teeth;

a compression link, assembled within said second fixed base and the first end of said compression link extending toward the outside of said shell, for receiving an external force while supporting said adjustable height apparatus; and a lever, pivoted inside said shell, between said compression link and said supporting means, comprising:

a second elastic component; and a detent, the first end of said lever connected with said second elastic component and the elasticity of said second elastic component being sufficient to have close contact between the first end of said lever and the second end of said compression link, said detent at the second end of said lever for engagement with said teeth of said height-positioning component and departing from contact with said height-positioning component when an external force applied to said compression link, said sleeve extending toward the outside of said shell by the elasticity of said first elastic component for adjusting the height of said bottom base of said supporting means.

15. The apparatus as recited in claim 14, wherein said first and said second elastic components are springs.

16. The apparatus as recited in claim 14, wherein the first end of said compression link further comprises an L-type lever for connecting with a button, for adjusting the height, of the top wall of said projector.

17. An adjustable height apparatus for supporting a horizontal projector, comprising a shield assembly, a supporting means, a compression link and a fixture means, wherein said shield assembly assembled inside said projector, said supporting means, assembled within said shield assembly, comprising a bottom base, a first elastic component and a height-positioning component with a plurality of teeth, utilized to support said projector, said compression link, assembled within said shield assembly, the first end of said compression link extending toward the outside of said shield assembly, said fixture means, comprising a second elastic component, a detent and an inclined plane, characterized in that said detent, comprising a two-teeth structure, being matched with said teeth of said height-positioning component by the elasticity of said second elastic component, the second end of said compression link having contact with said inclined plane to separate said two-teeth structure of said detent from said teeth of said height-positioning component when the first end of said compression link receives an external force to perform a vertical displacement, whereby said supporting means extending toward the outside of said shield assembly by the elasticity of said first elastic component for adjusting the height of said bottom base of said supporting means.

18. The apparatus as recited in claim 17, wherein materials of said detent and said inclined plane of said fixture means comprises nylon and 15% glass fiber.

19. The apparatus as recited in claim 17, wherein the second end of said compression link further comprises a curved surface for contacting said inclined plane.

20. The apparatus as recited in claim 17, wherein said shield assembly further comprises two guides for tracking said fixture means to shift transversely.

21. The apparatus as recited in claim 20, wherein said fixture means further comprises two round bulges for fitting with said guides to shift transversely.

22. The apparatus as recited in claim 17, wherein said adjustable height apparatus further comprises a third elastic component located between the first end of said compression link and said shield assembly to cooperate with said second elastic component.

23. The apparatus as recited in claim 22, wherein said first, said second and said third elastic components are springs.

24. The apparatus as recited in claim 17, wherein the first end of said compression link further comprises an L-type lever connecting with said button.

* * * * *